US012610054B2

(12) United States Patent
Zhao et al.

(10) Patent No.: US 12,610,054 B2
(45) Date of Patent: Apr. 21, 2026

(54) SAMPLE CLIPPING FOR LOW DYNAMIC RANGE (LDR) BASED IMAGE AND VIDEO CODING

(71) Applicant: Tencent America LLC, Palo Alto, CA (US)

(72) Inventors: Xin Zhao, Palo Alto, CA (US); Ding Ding, Palo Alto, CA (US); Shan Liu, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 19 days.

(21) Appl. No.: 18/756,233

(22) Filed: Jun. 27, 2024

(65) Prior Publication Data

US 2025/0113036 A1    Apr. 3, 2025

Related U.S. Application Data

(60) Provisional application No. 63/542,201, filed on Oct. 3, 2023.

(51) Int. Cl.
| | |
|---|---|
| *H04N 19/00* | (2014.01) |
| *H04N 19/132* | (2014.01) |
| *H04N 19/136* | (2014.01) |
| *H04N 19/176* | (2014.01) |
| *H04N 19/184* | (2014.01) |
| *H04N 19/50* | (2014.01) |
| *H04N 19/70* | (2014.01) |
| *H04N 19/82* | (2014.01) |
| *H04N 19/186* | (2014.01) |

(52) U.S. Cl.
CPC ......... *H04N 19/132* (2014.11); *H04N 19/136* (2014.11); *H04N 19/176* (2014.11); *H04N 19/184* (2014.11); *H04N 19/50* (2014.11); *H04N 19/70* (2014.11); *H04N 19/82* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 2014/0044372 A1* | 2/2014 | Mertens | ................. | G06T 9/007 |
| | | | | 382/248 |
| 2015/0302562 A1* | 10/2015 | Zhai | ....................... | H04N 19/44 |
| | | | | 382/233 |
| 2017/0064227 A1* | 3/2017 | Lin | ........................... | G06T 5/70 |
| 2021/0062095 A9* | 3/2021 | Le Pendu | ............ | H04N 19/147 |
| 2022/0210431 A1* | 6/2022 | Xiu | ....................... | H04N 19/577 |
| 2023/0019544 A1* | 1/2023 | Solovyev | .............. | H04N 19/52 |

OTHER PUBLICATIONS

International Search Report and Written Opinion issued in International Patent Application No. PCT/US 24/36077 dated Sep. 20, 2024, 11 pages.

* cited by examiner

*Primary Examiner* — Zhihan Zhou
(74) *Attorney, Agent, or Firm* — Crowell & Moring LLP

(57) ABSTRACT

This disclosure relates generally to sample clipping in video or image and particularly to methods and systems for sample clipping in video or image based on Low Dynamic Range (LDR) coding. For example, an encoder or decoder may determine a sample clipping range for a block and apply a sample clipping procedure based on the sample clipping range during one of various stages of encoding or decoding process of the block. The sample clipping range may be derived from an LDR selected for encoding the block.

10 Claims, 11 Drawing Sheets

100

110

140

130

120

NETWORK
150

1100

START  S1101 determining a sample clipping range for a block  S1110 applying a clipping operation during an encoding process of the block according to the sample clipping range to generate encoded samples for the block  S1120 including the encoded samples of the block and an indication of the sample clipping range in the bitstream  S1130

STOP  S1199

SAMPLE CLIPPING FOR LOW DYNAMIC RANGE (LDR) BASED IMAGE AND VIDEO CODING

INCORPORATION BY REFERENCE

This application is based on and claims the benefit of priority to U.S. Provisional Patent Application No. 63/542, 201 filed on Oct. 3, 2023 and entitled "Signaling of Low Dynamic Range for Image and Video Coding," which is herein incorporated by reference in its entirety.

TECHNICAL FIELD

This disclosure relates generally to sample clipping in video or image and particularly to methods and systems for sample clipping in video or image based on Low Dynamic Range (LDR) coding.

BACKGROUND

Uncompressed digital video can include a series of pictures, and may associated with specific bitrate requirements for storage, data processing, and for transmission bandwidth in streaming applications. One purpose of video coding and decoding can be the reduction of redundancy in the uncompressed input video signal, through various compression techniques while reducing signaling overhead. In some applications, bit depth of some video/image samples may be reduced in order to further increasing coding efficiency.

SUMMARY

This disclosure relates generally to sample clipping in video or image and particularly to methods and systems for sample clipping in video or image based on Low Dynamic Range (LDR) coding. For example, an encoder or decoder may determine a sample clipping range for a bock and apply a sample clipping procedure based on the sample clipping range during one of various stages of encoding or decoding process of the block. The sample clipping range may be derived from an LDR selected for encoding the block.

In some example implementations, a method for decoding a block in a bitstream of a video or an image is disclosed. The method may include receiving the bitstream; determining a sample clipping range from the bitstream for the block; and applying a clipping operation during a decoding process of the block according to the sample clipping range to generate decoded samples for the block.

In the example implementations above, the sample clipping range comprises an upper end, maxClip, and a lower end, maxClip, for sample values, and wherein the sample clipping operation for an input sample x comprises performing a function of max (min (x, maxClip), minClip), where the max( ) function returns a maximum value of its input and the min( ) function returns a minimum value of its inputs.

In any one of the example implementations above, the sample clipping range is determined based on a sample range specified in the bitstream for a Low Dynamic Range (LDR).

In any one of the example implementations above, LDR is not applied to the block and the sample clipping range is specified by an internal sample bit depth for the block under which the block is encoded.

In any one of the example implementations above, LDR is not applied to the block and the sample clipping range is specified in one or more syntax elements in the bitstream unrelated to LDR.

In any one of the example implementations above, an LDR is applied to the block and the sample clipping range is determined according to an overlap between the LDR and another sample range unrelated to the LDR and indicated in the bitstream for the block.

In any one of the example implementations above, the clipping operation is applied during an intermediate or final reconstruction samples of the block at a loop filtering stage.

In any one of the example implementations above, the clipping operation is applied during an intermediate or final reconstruction samples of the block at a loop filtering stage.

In any one of the example implementations above, the clipping operation is applied during a reconstruction process after adding prediction values and residual values for the block.

In any one of the example implementations above, the clipping operation is applied on intermediate of output values of any of filtering processes applied on prediction samples or reconstructions samples of the block.

In any one of the example implementations above, sample clipping ranges are applied separately to different color components of the block in the clipping operation.

In any one of the example implementations above, sample clipping ranges are applied separately to different blocks of the video or the image.

In any one of the example implementations above, the clipping operation is applied further based on coded information of the block comprising at least one of neighboring reconstructed sample values, quantization parameters, a frame resolution, a temporal layer of associated with the block.

Aspects of the disclosure also provide an encoding method corresponding to the decoding method above.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

Aspects of the disclosure also provide non-transitory computer-readable recording mediums for storing the bitstream above.

Aspects of the disclosure further provides a method for generating the bitstream above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

While the description below may focus on video encoding and decoding, the various disclosed embodiments may be applicable to processing of still images.

Figure 1:
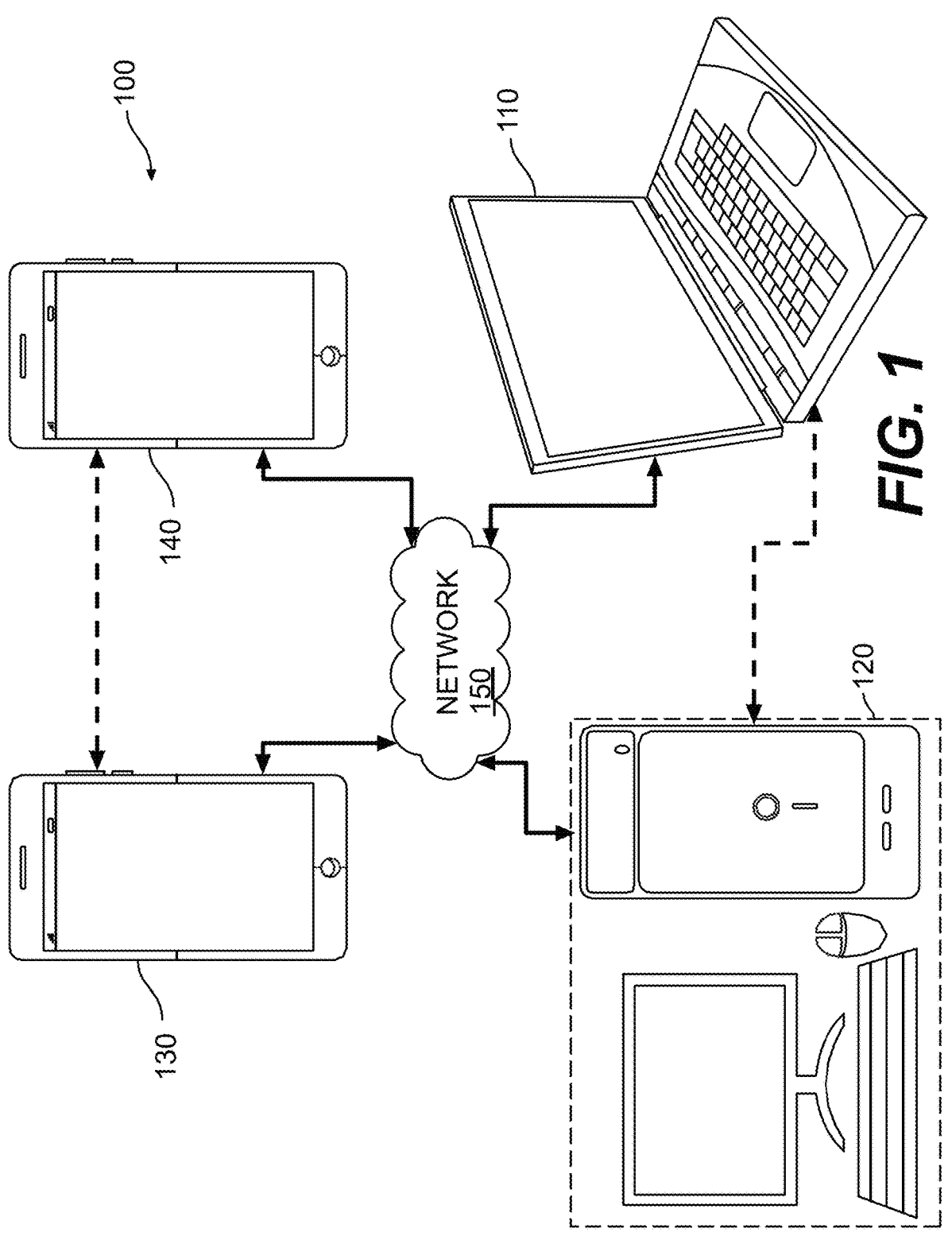
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
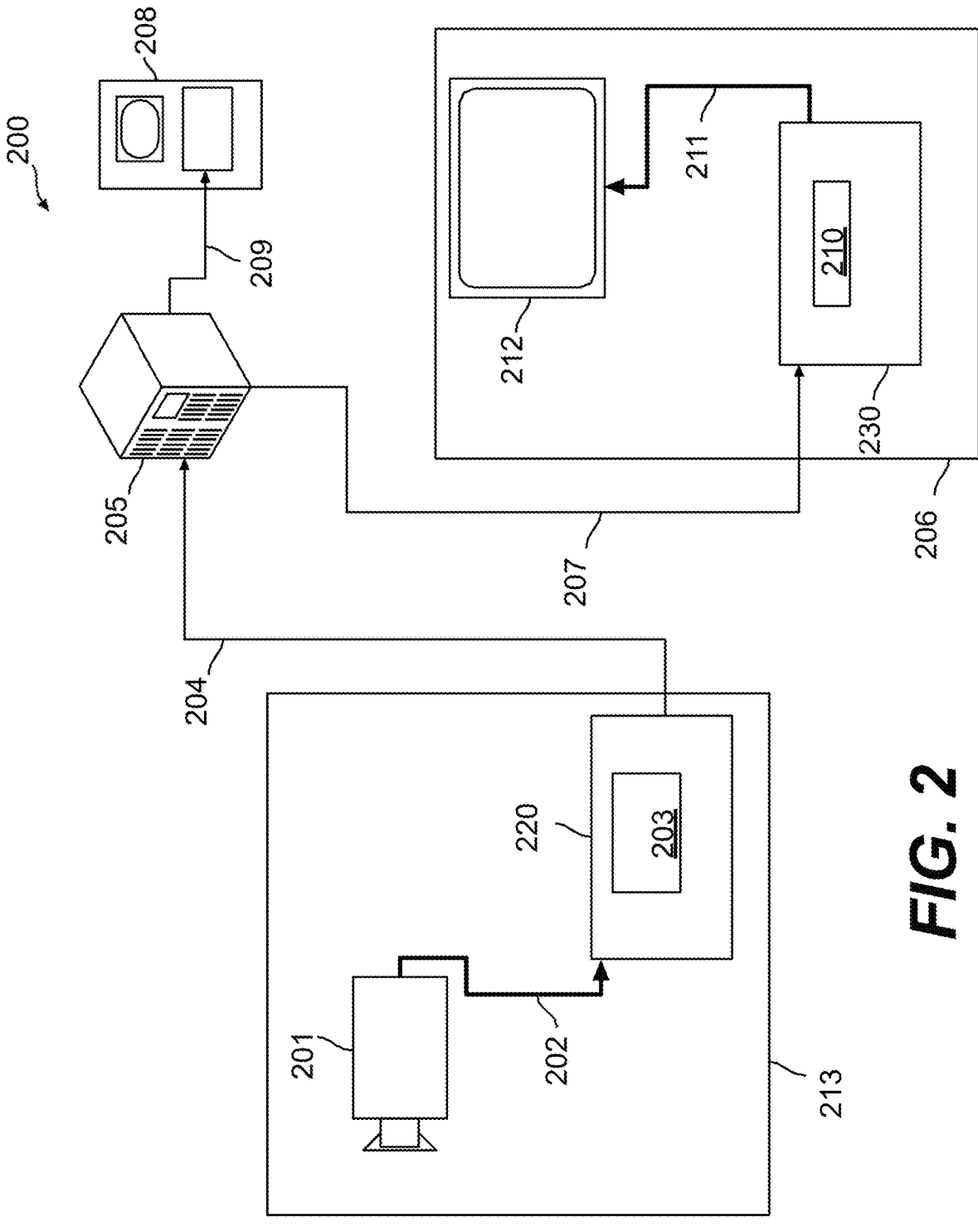
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
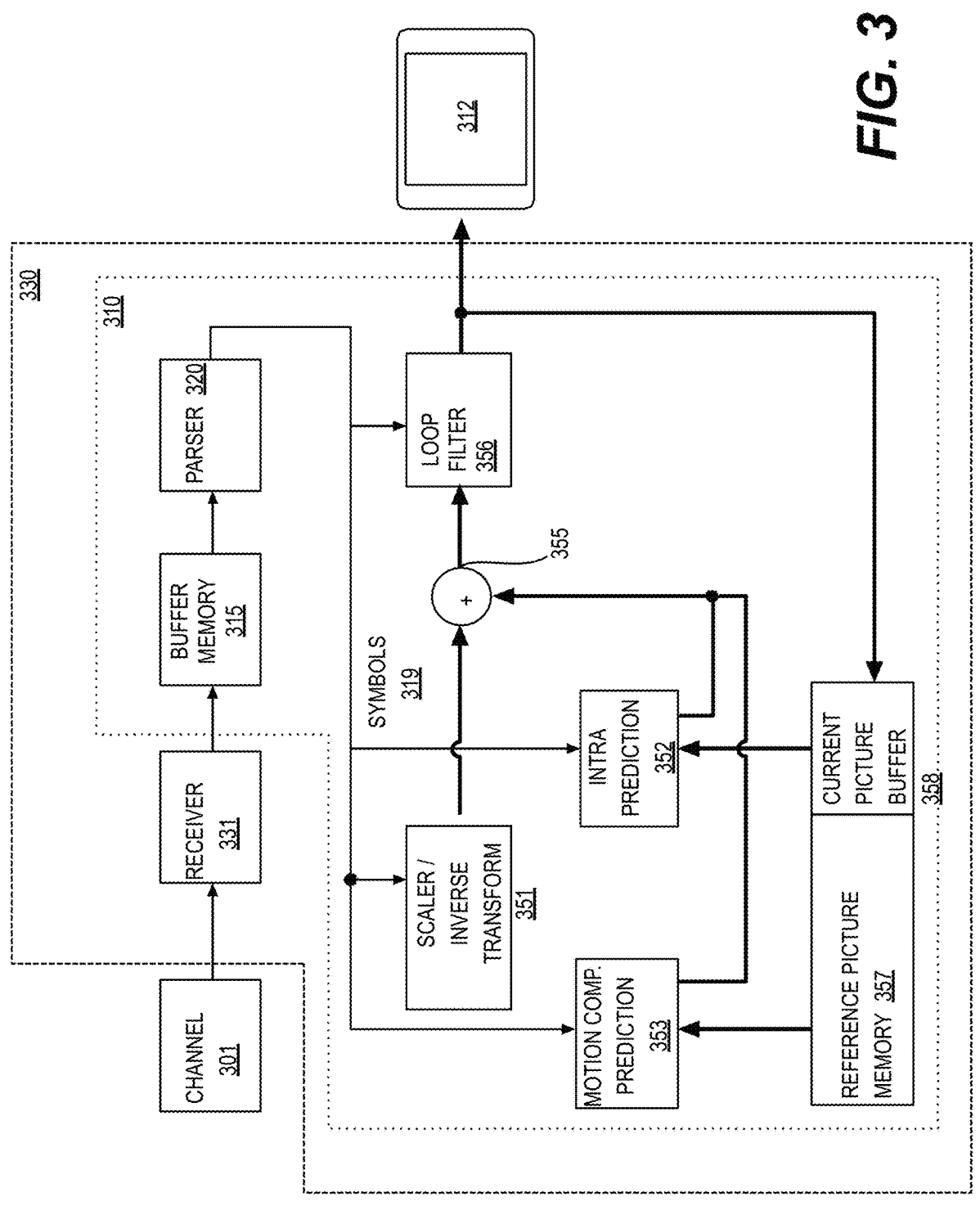
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330)

can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
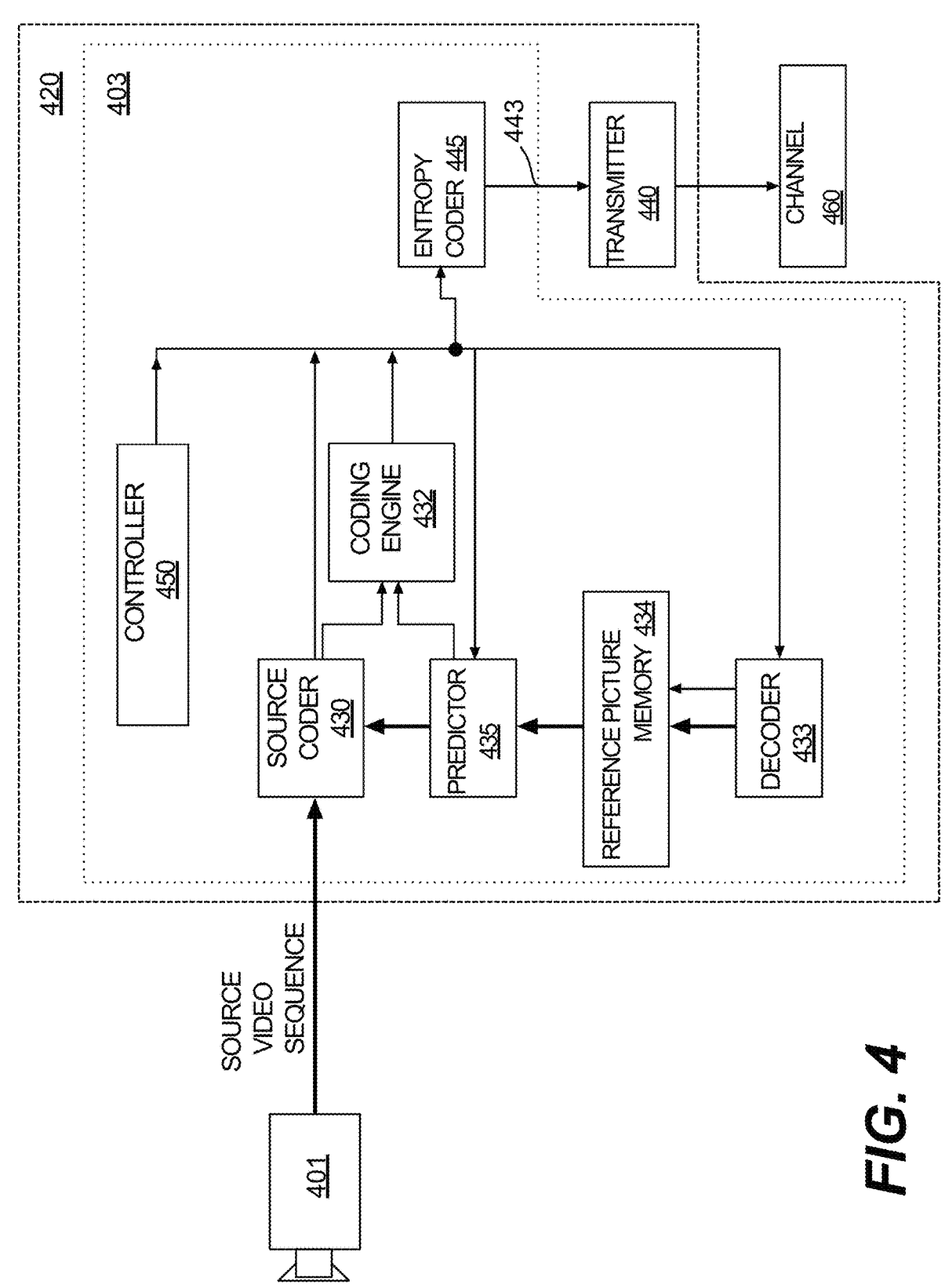
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
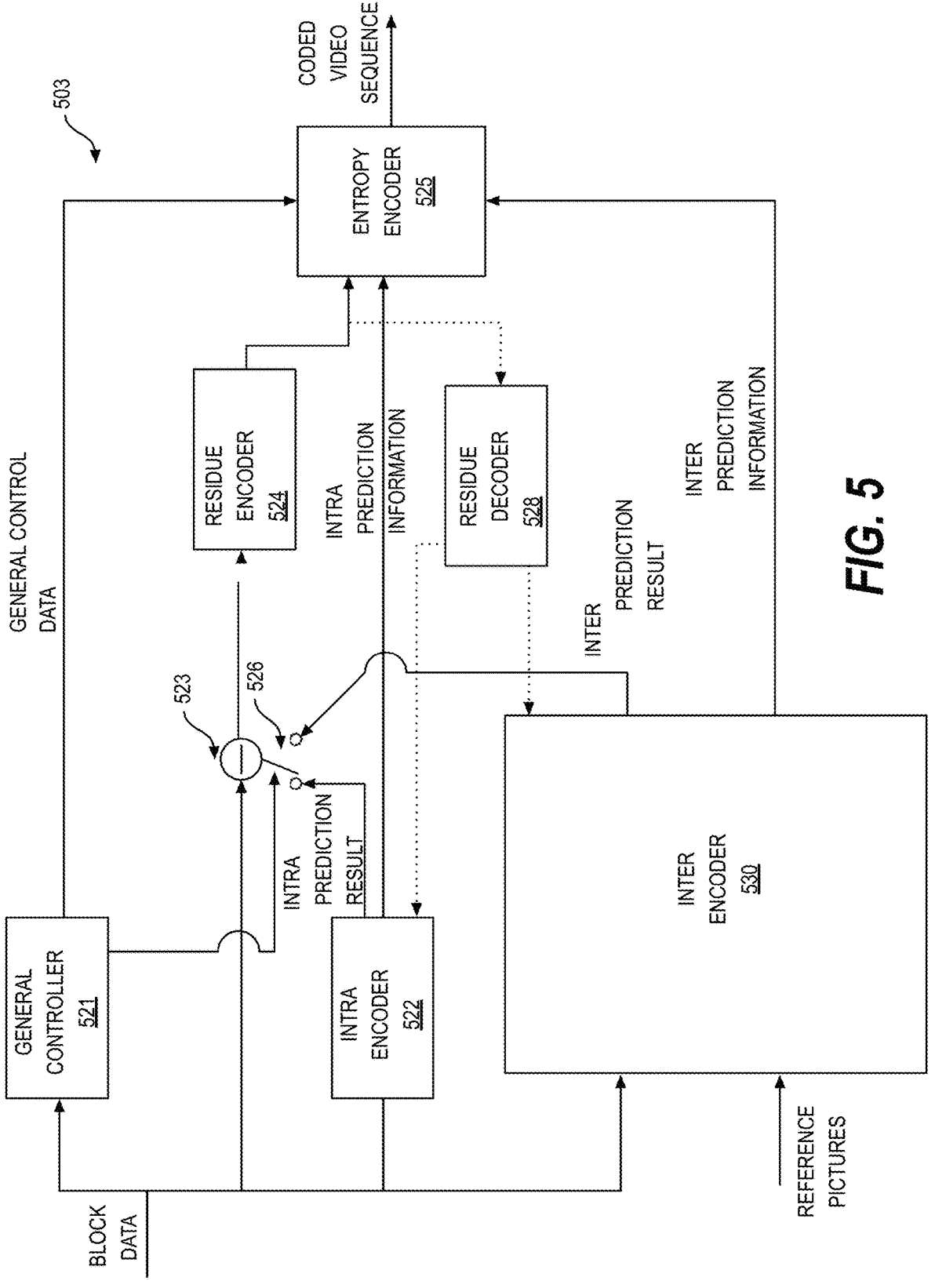
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
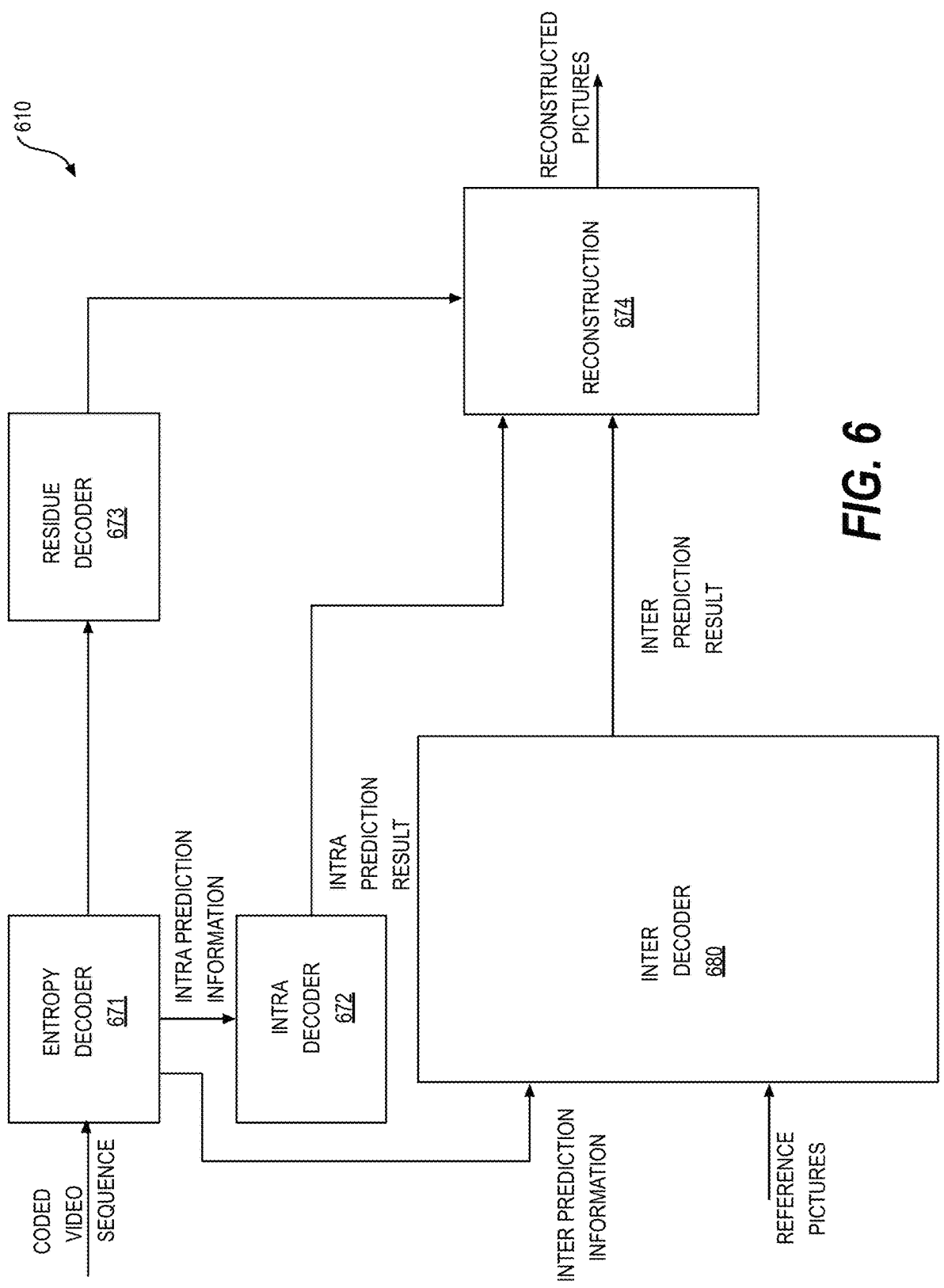
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
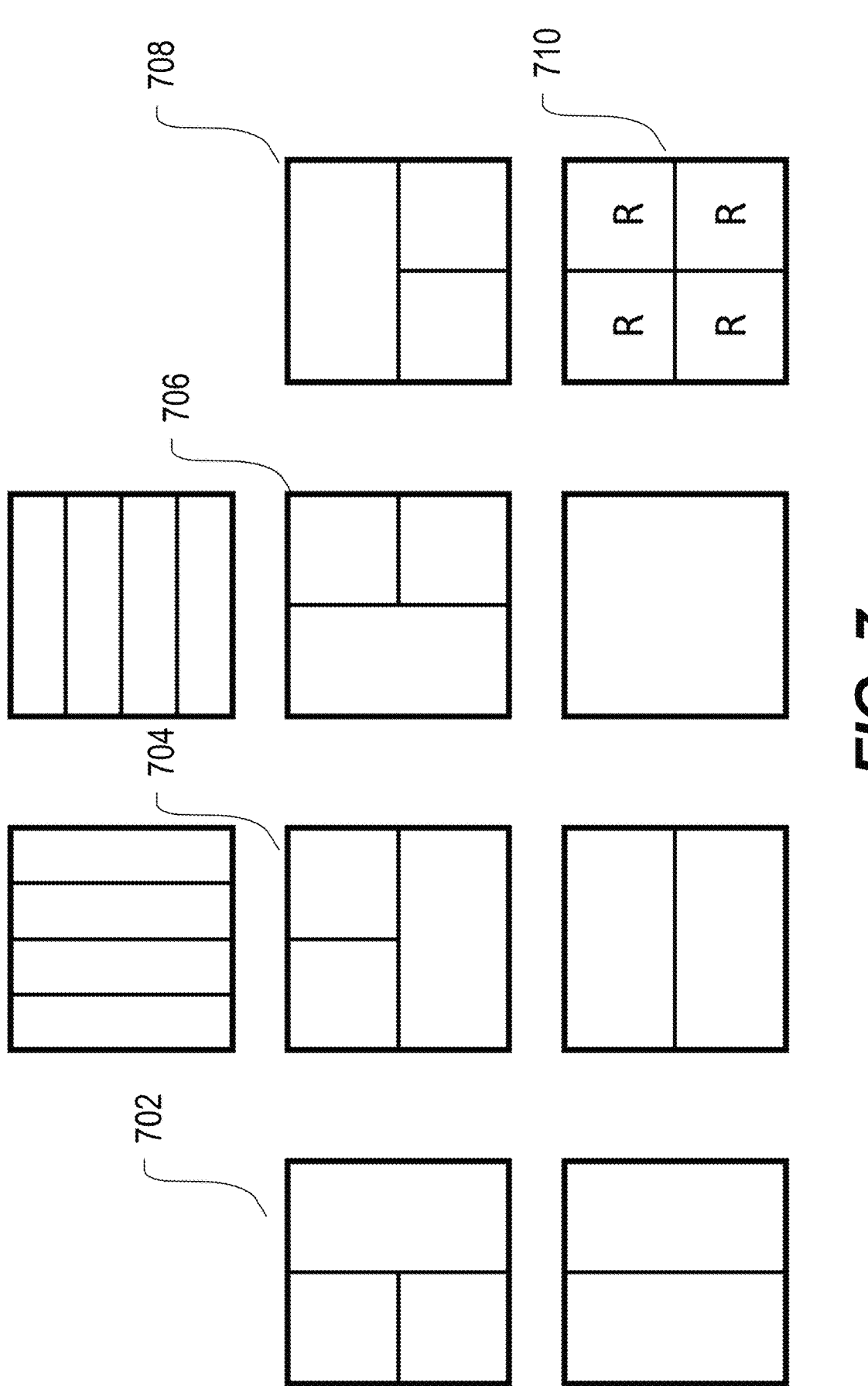
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

Figures 8, 9:
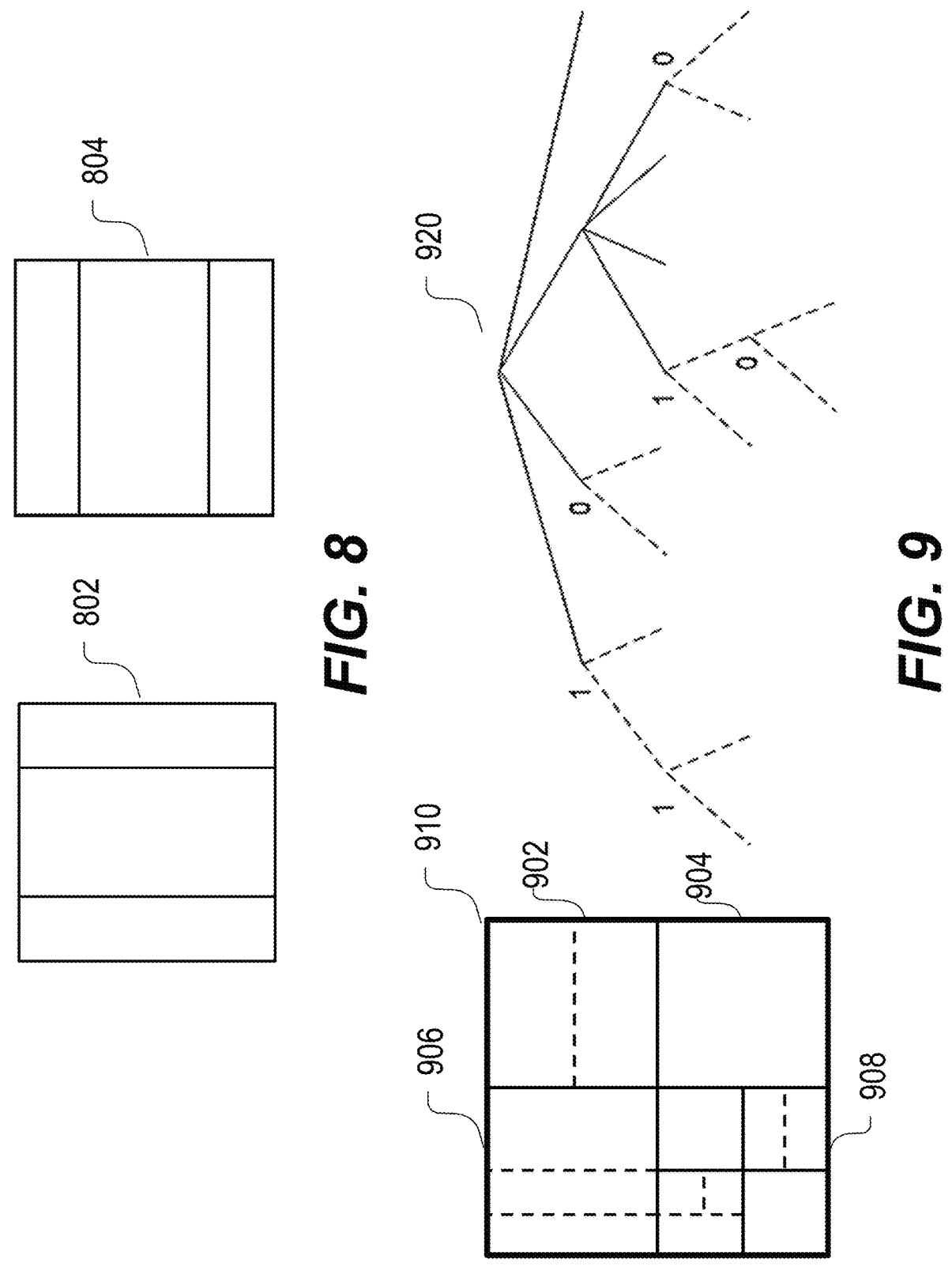
FIG. 8 shows another scheme of coding block partitioning according to example embodiments of the disclosure.
FIG. 9 shows another scheme of coding block partitioning according to example embodiments of the disclosure.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:

CTU size: the root node size of a quadtree (size of a base block)

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

The division of a video frame into various levels of partitions are, to certain extent, applicable to a still image, or an image not in a video context. Other manners of partitioning may be applied in a still image (referred to as "image"). The term "block" is used below for purposes of representing a coding/decoding unit in Low Dynamic Range encoding/decoding implementations. A block may be one or more partitions above or one or more partitions determined using any other partitioning schemes. A block, for example, may include various color components, e.g., luma and chroma components, or RGB components, and the like. The various implementations described below with respect to LDR are applicable to blocks in video frames or in still images. The proposed implementations below may be used separately or combined in any order. Further, each of the embodiments of encoder, decoder, and bitstream may be implemented by processing circuitry (e.g., one or more processors or one or more integrated circuits). In one example, the one or more processors may execute a program that is stored in a memory or a non-transitory computer-readable medium to implement the various embodiments below. Alternatively, a dedicated circuitry may be configured to implement such an encoder to decoder.

By way of instruction to LDR, for machine consumption in computer vision, automation, and other autonomy applications, and for some other situations, lower bit depth for videos or images may be sufficient. A video or image having an original bit depth of, e.g., 8 bit each pixel for each color component, may be more than adequate for these applications. For these applications, the original data with higher bit depth may be reduced to a lower bit depth before the original data is compressed or encoded into a bitstream. Video/image data with reduced bit depth may be compressed using any compression and encoding scheme. The decoder may be configured to reconstruct the video/image samples having the reduced bit depth. The decoder may further implement a bit depth up conversion or recovering procedure to generated decoded samples with, e.g., the original bit depth. The up-conversion/recovering step may be optional. Information loss during the mapping process by the encoder to LDR that is not recovered by the decoder may nevertheless not negatively affect these applications due to the nature and use of the images/videos in these applications.

In the following context, the reduced bit depth may be referred to as Lower Dynamic Range (LDR) for the videos or images. An LDR thus may represents a range of sample values that is smaller than the dynamic range of the original sample sequence. For instance, an LDR may have $2^{N_1}$ different sample values, where $N_1$ is an integer value that is less than the bit depth $N_2$ of the original sequence. For example, if the original sequence has a bit depth of $N_2=8$, then $N_2$ could be any integer value less than 8, such as 1, 2, 3, 4, 5, 6, or 7. $N_1$ thus represents the number of bits needed to represent all the sample values associated with the LDR. For another example, if the original sequence has a bit depth of $N_2=10$, then a 9-bit or 8-bit dynamic range would also be considered LDR in addition to 1, 2, 3, 4, 5, 6, or 7-bit dynamic ranges.

In some example implementations, an encoder may first determine whether a block of an input video frame or image (for simplicity, the term "image" is used below to represent either a video frame or a still image) is to be applied with LDR. If the LDR is to be applied to the block, the encoder may further determine the LDR to be applied. For example, the encoder may determine an original bit depth $N_2$ and the reduced bit depth $N_1$ for LDR. The reduced bit depth $N_1$ would provide the value range of the bit-depth-reduced samples before compression. The encoder may then perform an LDR mapping procedure to map the original input samples (with a value range is determined by the original bit depth $N_2$) to mapped sample values in the reduced value range (the LDR) characterized by the bit depth $N_1$. The mapped sample values for the block may then be encoded via any encoding processes described above.

A decoder, on the other hand, may first receive a bitstream and determine whether an LDR has been applied to the block. The decoder may further determine the LDR applied to the block. For example, the decoder may determine the bit depths $N_1$ and $N_2$ above either from the bitstream or from other information. The decoder may then decode the block from the bitstream to generate reconstructed samples of the block with an LDR bit depth of $N_1$. The decoder may then perform a mapping of the reconstructed sample to mapped samples of the block with the original bit depth of $N_2$.

In some example implementation of an encoder or decoder, a sample clipping operation may be applied on the sample values during encoding and decoding of a block. The sample clipping operation may be based on a sample clipping range, represented by maxClip and minClip, where maxClip represents an upper end of the sample clipping range and the minClip represents the lower end of the sample clipping range, and wherein the samples fall within maxClip and minClip after the clipping operation.

In some example implementations, the sample clipping operation may be a function with sample value x as input, for generating an output of max (min (x, maxClip), minClip), where the max( ) function represents a function for returning the maximum value of its inputs and the min( ) function represents a function for returning the minimum value of its inputs.

An encoder thus may first determine a sample clipping range for a block and then applying the sample clipping operation during one of the various stages of the encoding process as described in the examples below, and then including encoded block and information for the sample clipping range in a bitstream. Likewise, a decoder may receive a bitstream, determine a sample clipping range for a block from the bitstream, and then applying the sample clipping operation during one of the various stages of the decoding process as described in the examples below.

The sample clipping range and sample clipping operation above may or may not be related to LDR. In some example implementations, the maxCLip and minClip values above for delineating the sample clipping range may be derived by the minimum sample value and maximum sample value specified by an LDR selected for encoding the block.

In some other example implementations, LDR may not be applied to the block, and the sample clipping range above for the sample clipping operation may be specified by an internal bit depth with which the codec for encoding the block operates.

In some other example implementations, LDR may not be applied to the block, and the sample clipping range above for the sample clipping operation may be specified by another one or multiple syntaxes in the bitstream for specifying the clipping range values.

In some other example implementations, LDR may be applied to the block, the sample clipping range for the sample clipping operation may be derived as an overlapping part of multiple sample clipping ranges. Such multiple sample clipping ranges may be determined from the bitstream. One of the multiple sample clipping ranges may specified by a minimum sample value and a maximum sample value for an LDR selected for encoding the block. Another sample clipping range of the multiple sample clipping ranges, for example, may be an explicitly signaled clipping range in bitstream that is unrelated to LDR.

In some other example implementations, the sample clipping operation above may be performed on sample values at selected processing stage of the encoding or decoding. For example, the sample clipping operation may be performed on an intermediate or final reconstruction sample values at the loop filtering process in the encoder, or on an intermediate or final reconstruction sample values at various stages of a filtering process. For another example, the sample clipping operation may be performed on intermediate or final reconstruction sample values at the intra and/or inter prediction process in the encoder or decoder. For another example, the sample clipping operation may be performed on the reconstruction process after adding the prediction value and residual value in the encoder or decoder. For yet another example, the sample clipping operation may be performed on intermediate or output values of any of the filtering process applied on the prediction samples or reconstruction samples in the encoder or in the decoder. One example of the such a filtering process may be a process for Luma Mapping Chroma Scaling (LMCS).

In some other example implementations, different sample clipping value ranges are applied for different color components.

In some other example implementations, different sample clipping value ranges are applied for luma and chroma color components.

In some other example implementations, different sample clipping values ranges are applied for different blocks in an image/video.

In some other example implementations, the sample clipping operation may be conditionally applied based on coded information, including but not limited to neighboring reconstructed sample values, quantization parameters, frame resolution, temporal layer of the current picture.

Figure 10:
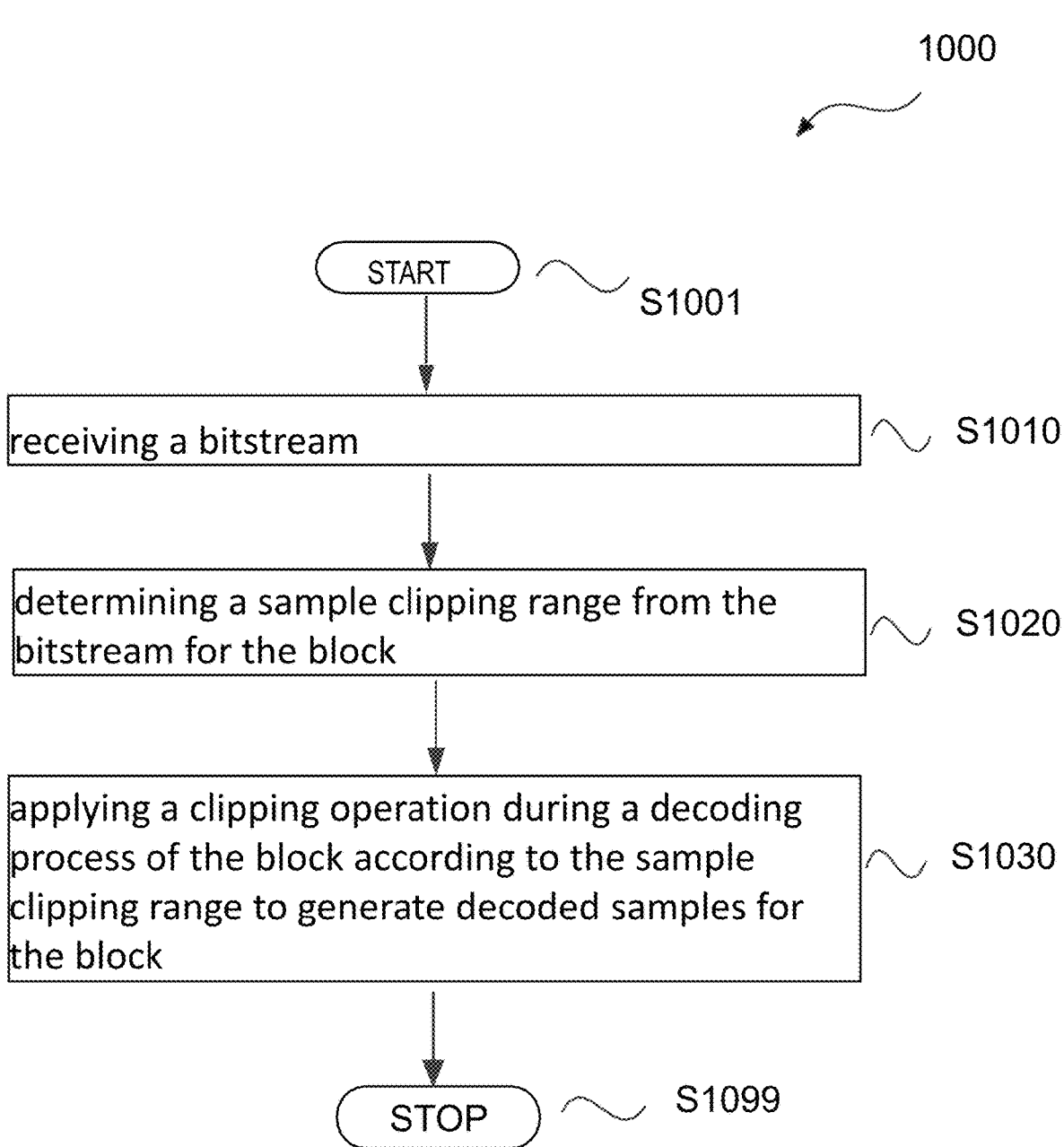
FIG. 10 shows an example logic flow for a decoding method.

FIG. 10 illustrates an example logic flow 1000 according the implementations above for a decoding method. The logic flow 1000 starts at S1001. In S1010, a bitstream is received. In S1020, a sample clipping range is determined from the bitstream for the block. In S1030, a clipping operation is applied during a decoding process of the block according to the sample clipping range to generate decoded samples for the block. The logic flow 1000 stops at S1099.

Figure 11:
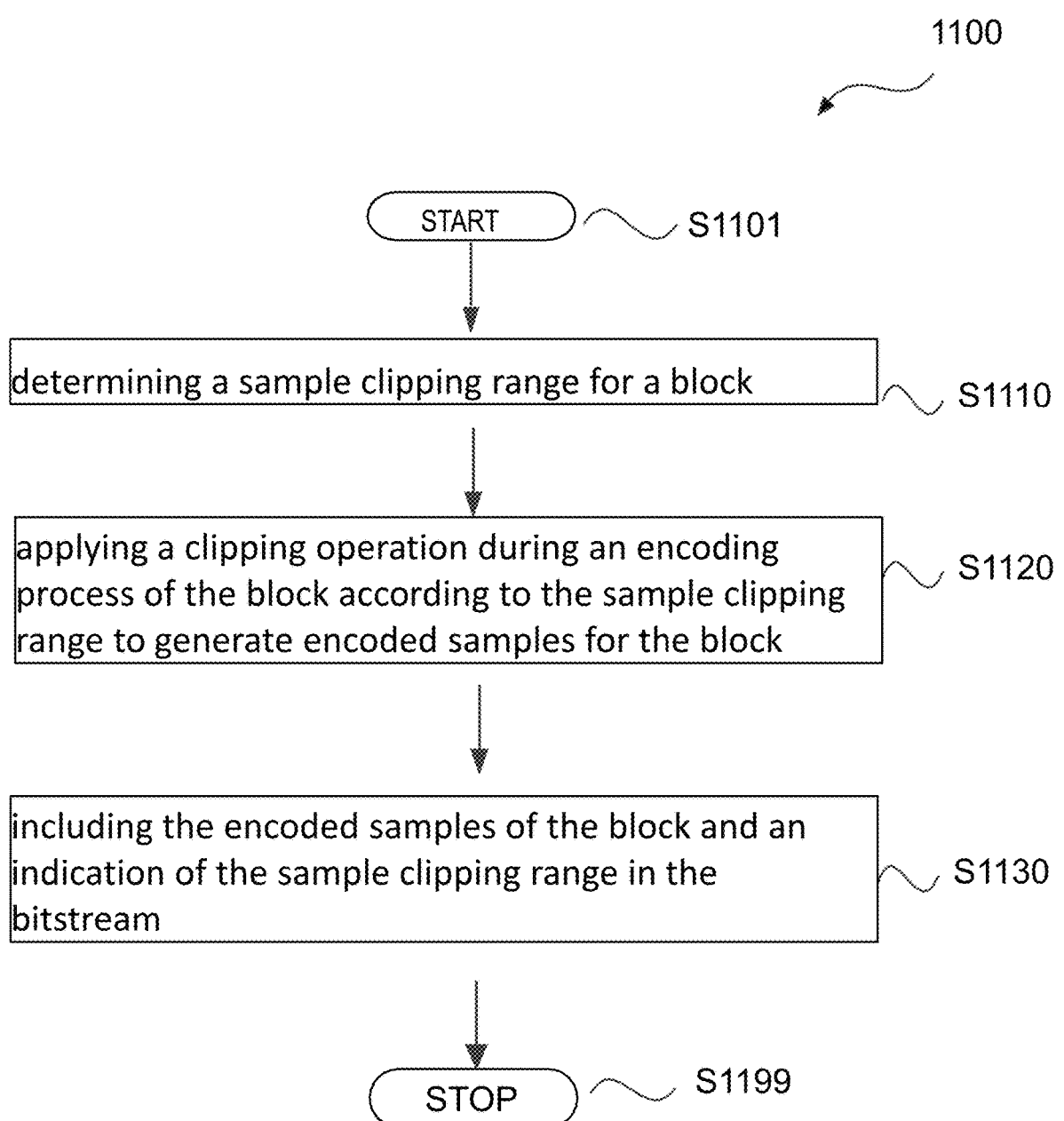
FIG. 11 shows an example logic flow for an encoding method.

FIG. 11 illustrates an example logic flow 1100 according the implementations above for an encoding method. The logic flow 1100 starts at S1101. In S1110, a sample clipping range is determined for the block. In S1120, a clipping operation is applied during an encoding process of the block according to the sample clipping range to generate encoded samples for the block. In S1130, the encoded samples of the block and an indication of the sample clipping range is included in the bitstream. The logic flow 1100 stops at S1199.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
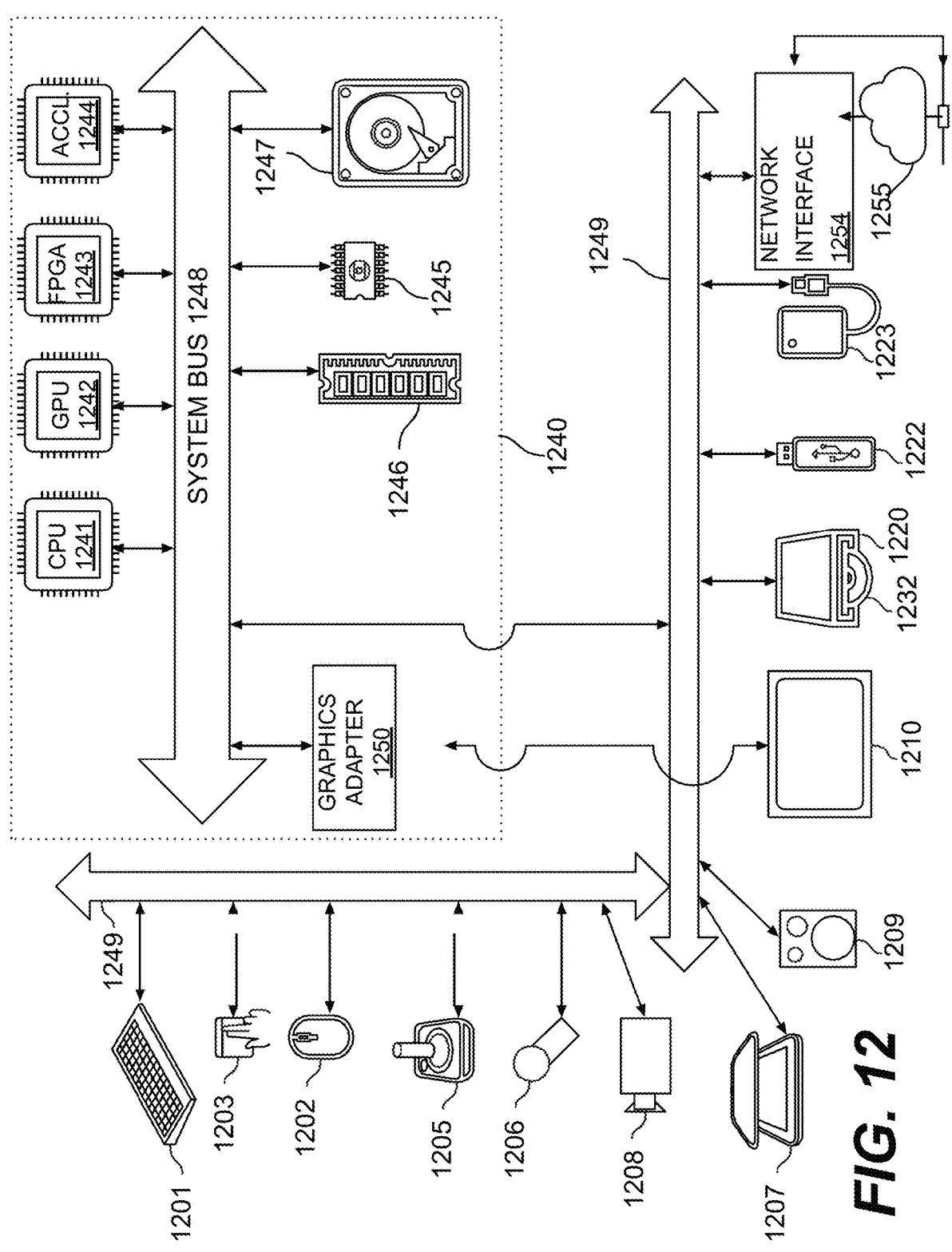
FIG. 12 shows a schematic illustration of a computer system in accordance with example embodiments of this disclosure.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a block in a bitstream of a video or an image, comprising:
receiving the bitstream;

16 determining a sample clipping range from the bitstream for the block; and
applying a clipping operation during a decoding process of the block according to the sample clipping range to generate decoded samples for the block,
wherein:
the sample clipping range comprises an upper end, maxClip, and a lower end, maxClip, for sample values, and wherein the sample clipping operation for an input sample x comprises performing a function of max (min(x, maxClip), minClip), where the max( ) function returns a maximum value of its input and the min( ) function returns a minimum value of its inputs; and
the sample clipping range is determined:
based on a sample range specified in the bitstream for a Low Dynamic Range (LDR); or
according to an overlap between an applied LDR and another sample range unrelated to the LDR and indicated in the bitstream for the block.

2. The method of claim 1, wherein the clipping operation is applied during an intermediate or final reconstruction samples of the block at a loop filtering stage.

3. The method of claim 1, wherein the clipping operation is applied during a reconstruction process after adding prediction values and residual values for the block.

4. The method of claim 1, wherein the clipping operation is applied on intermediate of output values of any of filtering processes applied on prediction samples or reconstructions samples of the block.

5. The method of claim 1, wherein sample clipping ranges are applied separately to different color components of the block in the clipping operation.

6. The method of claim 1, wherein sample clipping ranges are applied separately to different blocks of the video or the image.

7. The method of claim 1, wherein the clipping operation is applied further based on coded information of the block comprising at least one of neighboring reconstructed sample values, quantization parameters, a frame resolution, a temporal layer of associated with the block.

8. A method for encoding a block in a bitstream of a video or an image, comprising:
determining a sample clipping range for the block;
applying a clipping operation during an encoding process of the block according to the sample clipping range to generate encoded samples for the block; and
including the encoded samples of the block and an indication of the sample clipping range in the bitstream,
wherein:
the sample clipping range comprises an upper end, maxClip, and a lower end, maxClip, for sample values, and wherein the sample clipping operation for an input sample x comprises performing a function of max (min(x, maxClip), minClip), where the max( ) function returns a maximum value of its input and the min( ) function returns a minimum value of its inputs; and
the sample clipping range is determined:
based on a sample range specified in the bitstream for a Low Dynamic Range (LDR); or
according to an overlap between an applied LDR and another sample range unrelated to the LDR and indicated in the bitstream for the block.

9. The method of claim 8, wherein the clipping operation is applied:

during a reconstruction process after adding prediction values and residual values for the block; or on intermediate of output values of any of filtering processes applied on prediction samples or reconstructions samples of the block.

10. A method for processing a block of a video or image, comprising converting the block to a bitstream, wherein the bitstream comprises:

an encoded block generated by:

determining a sample clipping range for the block; and applying a clipping operation during an encoding process of the block according to the sample clipping range to generate encoded samples for the block; and including the encoded samples of the block and an indication of the sample clipping range in the bitstream, wherein:

the sample clipping range comprises an upper end, maxClip, and a lower end, maxClip, for sample values, and wherein the sample clipping operation for an input sample x comprises performing a function of max (min(x, maxClip), minClip), where the max( ) function returns a maximum value of its input and the min( ) function returns a minimum value of its inputs; and the sample clipping range is determined:

based on a sample range specified in the bitstream for a Low Dynamic Range (LDR); or according to an overlap between an applied LDR and another sample range unrelated to the LDR and indicated in the bitstream for the block.

\* \* \* \* \*